US009171432B2

(12) United States Patent
Gerken, III et al.

(10) Patent No.: US 9,171,432 B2
(45) Date of Patent: Oct. 27, 2015

(54) CUSTOMER CHECKOUT ACCELERATOR

(75) Inventors: John Kenyon Gerken, III, Raleigh, NC (US); Thomas Joseph Prorock, Raleigh, NC (US); William S. Werdel, Raleigh, NC (US)

(73) Assignee: Toshiba Global Commerce Solutions Holdings Corporation (JP)

( * ) Notice: Subject to any disclaimer, the term of this patent is extended or adjusted under 35 U.S.C. 154(b) by 2211 days.

(21) Appl. No.: 12/140,212

(22) Filed: Jun. 16, 2008

(65) Prior Publication Data
US 2008/0265022 A1 Oct. 30, 2008

Related U.S. Application Data

(62) Division of application No. 09/672,435, filed on Sep. 28, 2000, now Pat. No. 7,403,907.

(51) Int. Cl.
G06Q 20/00 (2012.01)
G07G 1/00 (2006.01)
A47F 9/04 (2006.01)
G06Q 20/10 (2012.01)
G06Q 20/20 (2012.01)
G06Q 20/40 (2012.01)
(Continued)

(52) U.S. Cl.
CPC .............. *G07G 1/0036* (2013.01); *A47F 9/047* (2013.01); *G06Q 20/102* (2013.01); *G06Q 20/20* (2013.01); *G06Q 20/202* (2013.01); *G06Q 20/204* (2013.01); *G06Q 20/209* (2013.01); *G06Q 20/403* (2013.01); *G06Q 20/42* (2013.01); *G06Q 30/0224* (2013.01); *G06Q 30/0226* (2013.01); *G06Q 30/0238* (2013.01); *G06Q 30/0241* (2013.01)

(58) Field of Classification Search
None
See application file for complete search history.

(56) References Cited

U.S. PATENT DOCUMENTS

| 5,010,485 A | 4/1991 | Bigari ........................... 364/408 |
| 5,105,184 A | 4/1992 | Pirani et al. ................... 340/721 |
| 5,305,195 A | 4/1994 | Murphy ........................ 364/401 |

(Continued)

OTHER PUBLICATIONS

Office Action from U.S. Appl. No. 12/140,223 dated Aug. 16, 2011.

*Primary Examiner* — Ryan Zeender
*Assistant Examiner* — Christopher Buchanan
(74) *Attorney, Agent, or Firm* — Winstead, P.C.

(57) ABSTRACT

A system and method for accelerating customer sales transactions in a retail store. A customer checkout accelerator provides a customer user interface to initiate a request for a preapproval amount for a sales transaction before reaching the point of sale terminal for completion of the purchase transaction. A card reader integrated into the customer checkout accelerator reads a customer payment card number when the payment card is swiped through the reader. A customer checkout accelerator server module resident on a store controller server determines a preapproval amount for the sales transaction and transmits the request to an external card services system for payment approval. The customer checkout accelerator also provides the ability to purchase additional promotional items in the checkout lane with this process integrated into the payment preapproval process. Once payment approval is obtained from the external card services system, an entry is placed in a preapproval database associated with the customer checkout accelerator server module on the store controller server. The server module forwards the approval notification to the point of sales terminal where it is placed in a preapproval cache for use in completing the actual sale transaction.

12 Claims, 8 Drawing Sheets

(51) Int. Cl.
*G06Q 20/42* (2012.01)
*G06Q 30/02* (2012.01)

(56) References Cited

U.S. PATENT DOCUMENTS

| | | | |
|---|---|---|---|
| 5,384,449 A | 1/1995 | Peirce | 235/380 |
| 5,535,407 A | 7/1996 | Yanagawa et al. | 395/800 |
| 5,559,871 A | 9/1996 | Smith | 379/115.01 |
| 5,595,264 A | 1/1997 | Trotta, Jr. | 186/56 |
| 5,705,798 A | 1/1998 | Tarbox | 235/379 |
| 5,845,259 A | 12/1998 | West et al. | 705/14 |
| 5,890,136 A | 3/1999 | Kipp | 705/22 |
| 5,914,472 A | 6/1999 | Foladare et al. | 235/380 |
| 5,923,016 A | 7/1999 | Fredregill et al. | 235/380 |
| 5,963,917 A | 10/1999 | Ogram | 705/26 |
| 5,991,738 A | 11/1999 | Ogram | 705/26 |
| 5,992,570 A | 11/1999 | Walter et al. | 186/36 |
| 6,084,528 A | 7/2000 | Beach et al. | 340/5.9 |
| 6,098,879 A | 8/2000 | Terranova | 235/384 |
| 6,275,200 B1 | 8/2001 | Heady et al. | 345/418 |
| 6,611,811 B1 | 8/2003 | Deaton et al. | 705/14 |
| 6,904,412 B1* | 6/2005 | Broadbent et al. | 705/38 |
| 7,835,960 B2* | 11/2010 | Breck et al. | 705/35 |
| 2001/0029482 A1* | 10/2001 | Tealdi et al. | 705/38 |
| 2002/0044103 A1 | 4/2002 | Paulson | 345/1.1 |
| 2008/0270247 A1* | 10/2008 | Gerken et al. | 705/17 |
| 2009/0157528 A1* | 6/2009 | Hobson et al. | 705/26 |

* cited by examiner

PRE-APPROVAL DATABASE ENTRY

- POINT OF SALE TRANSACTION NUMBER
- DATE AND TIME OF SALES TRANSACTION
- AMOUNT OF SALES TRANSACTION
- PRE-APPROVAL AMOUNT REQUESTED
- PRE-APPROVAL AMOUNT APPROVED
- CREDIT(OR DEBIT) CARD NUMBER
- AUTHORIZATION NUMBER
- REQUEST STATUS (APPROVED/DENIED)
- ENCRYPTED PIN NUMBER
- POINT OF SALE CHECKOUT LANE
- OTHER EXTENSIONS (E.G., AMOUNT OF EXCESS CREDIT/DEBIT RELEASED)

FIG. 6

CUSTOMER CHECKOUT ACCELERATOR

CROSS REFERENCE TO RELATED APPLICATIONS

The present application is a divisional application of co-pending U.S. patent application Ser. No. 09/672,435, entitled "Customer Checkout Accelerator," filed Sep. 28, 2000, which is incorporated by reference herein. The present application claims priority benefits to U.S. patent application Ser. No. 09/672,435 under 35 U.S.C. §121.

BACKGROUND OF THE INVENTION

Merchants are continuously looking for ways to speed up the checkout process in retail establishments. A simple saving of a few seconds for each on can result in major savings when the seconds are applied to the hundreds or thousands of checkout lanes that may exist across all the retail stores of an enterprise.

The problem that exists today is that the checkout process is very heavily loaded on the back-end, specifically, the payment side of the sales transaction. Over the years, improvements have been made in the front-end of the sales process with the innovation of scanners, etc., but there is still much room for improvement in the payment area of the sales process.

In retailing technology, there are now many technology innovations that can enhance the customer checkout process. These include touch screen displays, Java-based graphical terminal sales applications, etc. Java-based graphical terminal sales applications include a Java-based customer graphical user interface (GUI) that is basically a read-only device used to display details of a sales transaction to the customer as it is occurring in real time, as well as optionally displaying advertising data to the customer. In addition, there is currently an increasing trend in the use of customer loyalty cards. There is also a further technology trend to combine the multiple loyalty cards with a credit card, onto a smart card. Versions of the "combination-loyalty cards" are already in use in several areas of the country.

There is a need for a system to enhance the payment processing in retail stores. Such a system will reduce the amount of time it takes to process a retail sales transaction. Such a solution can be taking the existing state-of-the-art technologies, (e.g., touch screen, smart cards, Java-based applications, etc.) and combining them into an application and system that reduces the amount of time it takes to complete each retail transaction.

SUMMARY OF THE INVENTION

The present invention is a device that functions to preapprove the payment for a retail sales transaction prior to the actual ringing of them transaction. In effect it decouples the existing time consuming payment process occurring at the back-end of the sales transaction and thereby improves the overall checkout time.

The invention builds upon the worldwide trend towards electronic purchases, and the use of the latest state of the art point of sale (POS) technology. Java-based customer GUI code is very modular, flexible, and extensible. Although Java customers GUIs are typically read-only applications, they can be modified to extend their functionality to provide a stand-alone system where customers can quests to the application. By adding interactive capabilities to the functionality of the Java-based customer GUI, the overall checkout time in a store can be improved. The present invention is a customer checkout accelerator interactive application whose primary purpose is to preapprove credit payment options, or other electronic non cash payment options, before the customer actually gets to the checkout station. The preapproval of the payment transaction speeds up the overall time it takes to checkout each customer. The present customer checkout accelerator invention operates on retail systems that use touch screen displays. It includes a Java-based interactive application that reads the selected payment preapproval options from the touch screen display and has the capability to read the input from a smart card reader. The combined use of these technologies integrated into a payment preapproval application and system provides a new function for consumers with the positive side effect of reduced checkout time for both the retailer and the consumer.

The main benefit of the present invention is that payment preapprovals can be performed during customer idle periods while standing in lines that can queue up to n-levels deep, in parallel with the terminal sales application processing other transactions. It can also result in improved customer satisfaction, resulting from an overall shorter waiting time to complete a sales transaction.

BRIEF DESCRIPTION OF THE DRAWINGS

The invention is better understood by reading the following detailed description of the preferred embodiment in conjunction with the accompanying drawings wherein:

FIG. 6 illustrates a database record layout of the preapproval information function in accordance with an exemplary embodiment of the present invention.

DETAILED DESCRIPTION OF THE INVENTION

Figure 1:
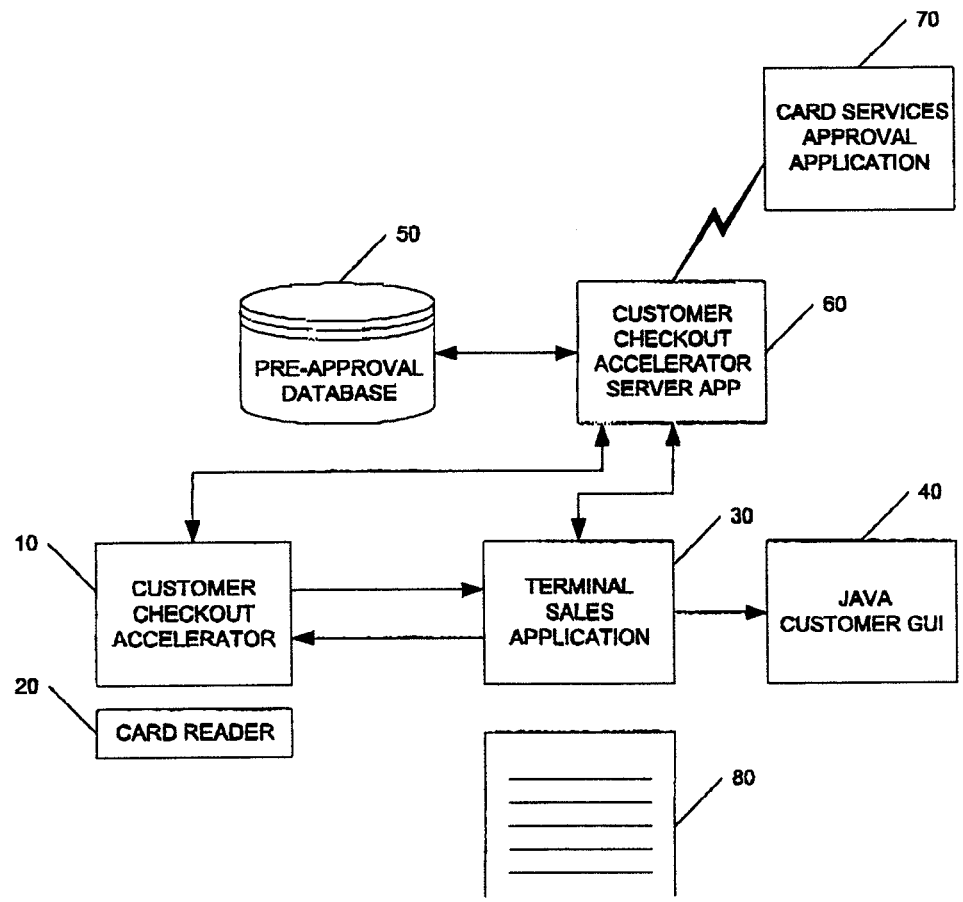
FIG. 1 illustrates the system components for the customer checkout accelerator in accordance with an exemplary embodiment of the invention.

FIG. 1 illustrates the major components of the customer checkout accelerator. The preferred embodiment for the customer checkout accelerator 10 includes a Java-based application running in a retail store system with a touch screen display. The customer checkout accelerator 10 can run on text-based ATM-like interfaces (i.e., primarily text-based) as well as other ATM-like intuitive interfaces such as the NCR Dynakey solution. The ATM-like interface is used in this invention since it is common and easily understood, but other graphical interfaces can also be used easily to accomplish the same task. The card reader 20 is attached to or integrated into the customer checkout accelerator 10. In actual implementation, card reader 20 can be positioned in a horizontal or vertical position. Terminal sales application 30 interfaces with the customer checkout accelerator 10 through socket interfaces or other well known programming interfaces in the computing industry, e.g., Remote Method Invocation (RMI). When a payment preapproval has completed in the checkout lane, the customer checkout accelerator (CCA) 10 sends the information over the socket to the terminal sales application 30 where the information is cached in the preapproval cache 80. The Java-based customer GUI application 40 receives input from the terminal sales application 30 and graphically displays it in a full screen display for the customer. The preapproval database 50 can be implemented in a number of ways, e.g., as a keyed access file or a relational database that can be accessed via SQL queries.

FIG. 6 indicates items that are typically included in a preapproval database record. Customer accelerator processor 60 is an application that runs on the store controller and is a server application performing several functions. These functions include: (1) provide indices between the multiple CCAs 10 that exist in a store and the card service providers for payment authorization; (2) provide interfaces between the terminal sales application 30 and the preapproval database 50; and (3) provide access to the preapproval database 50. Remote payment approval is provided by card services approval application 70. When a payment preapproval has completed in the checkout lane, the customer checkout accelerator 10 sends the information over the socket to the terminal sales application 30 where the information is cached in the preapproval cache 80.

Figure 2:
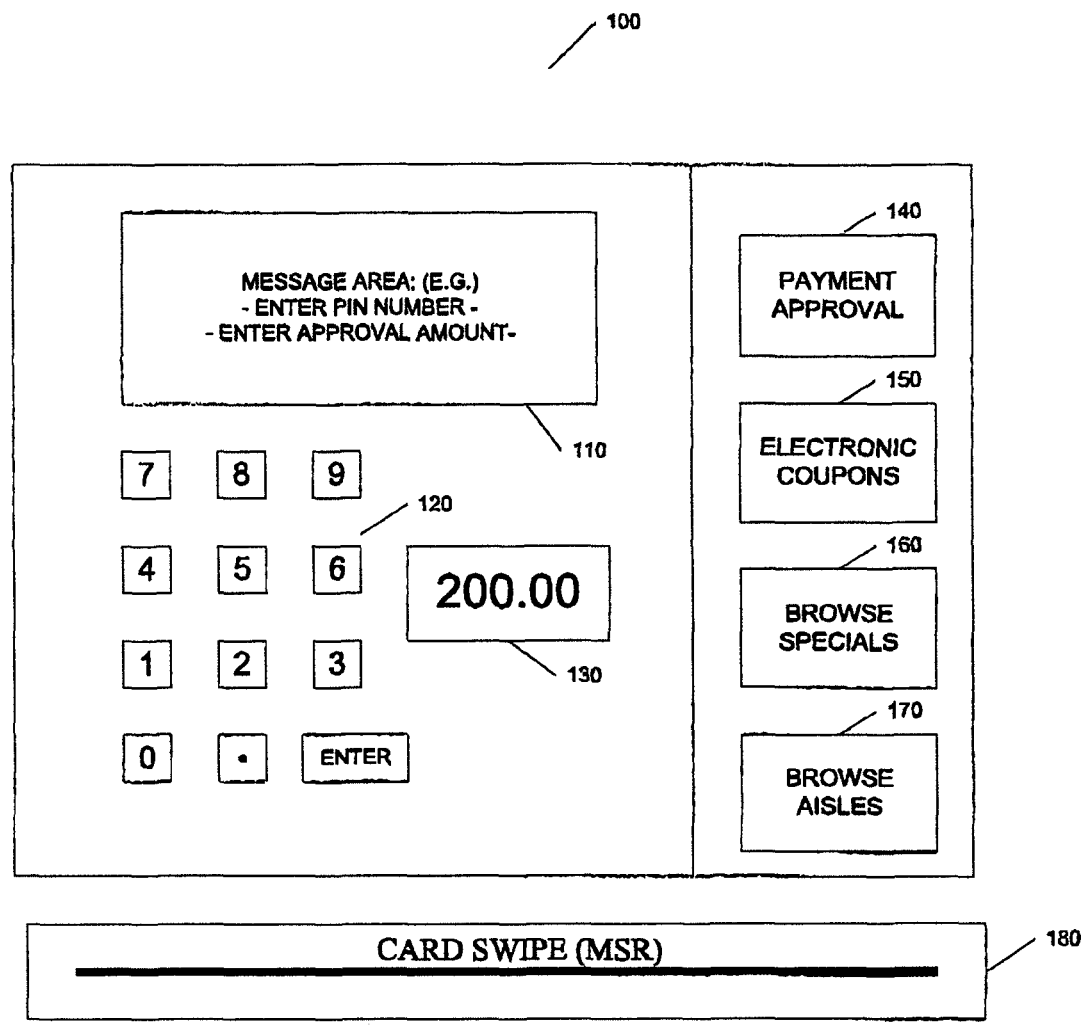
FIG. 2 illustrates a touch screen display in accordance with an exemplary embodiment of the present invention.

The following description provides an example of a typical preapproval/checkout scenario. The example focuses on the credit card payment scenario, but it should be clear to those skilled in the art that it is equally applicable to other forms of payment, such as debit cards, checks, electronic/Internet wallets, giftcards (electronic gift certificates), etc. A customer swipes a card at the card reader 20 as indicated in FIG. 2 (card swipe 180). The customer checkout accelerator 10 obtains the credit card number, loyalty card number, etc. from the customer's card. The customer is then presented with a preapproval amount. The amount can be determined by a number of factors, e.g., configurable by the store based on historical sales amounts by transaction, plus a delta; or based on the customer's actual purchases. In the it instance, this can be the average of all electronic fund transfer (EFT) sales plus ½ of the average of the maximum EFT sales amount. In the second instance, this can be the average amount of the customer's historical purchases, plus one standard deviation. The preapproval amount is presented to the customer for his acceptance. A customer can request a larger approval amount in fixed amount increments similar to the situation in an ATM withdrawal using touch screen keyboard 120, and payment approval key 140. The request is then sent from the CCA 10 to the server application 60. The sever application 60 forwards the request to the card services application 70 for processing the preapproval request. If the request is approved, it is assigned an approval number, which is stored on the store controller system server in the preapproval database 50. The server application 60 then forwards the status of the preapproval request back to the CCA 10, which in turn notifies the customer that the preapproval transaction is completed. At this point, the CCA 10 sends a message over the socket connection to the point of sale (POS) application 30 with the preapproval information. This enables the POS application 30 to store a cache 80 of preapprovals. The benefit provided here is that the POS application 30 does not need to go back to the store controller to access the preapproval database 50 during each transaction.

Eventually the customer bubbles up to the font of the checkout lane and scans his card. While this occurs, the POS terminal application 30 is ringing the order. While the order is being rung, the POS terminal application 30 retrieves the information for this loyalty account and credit account and preprints all of the information for the credit slip. A key feature of the present invention is that if the limit is exceeded during the processing of the sales transaction, a request is automatically made to the card service provider for additional approval in real time before the order is complete. The POS terminal application 30 then ensures the amount of the order is within the preapproval limit at the tender entry state. When the order is complete, the POS terminal application 30 assigns the transaction number to the customer record in the preapproval database 50 and marks the state of the order "complete".

The obvious location for the customer checkout accelerator is in the checkout lane itself, but the CCA 10 can be decoupled easily and located at various preapproval stations within a store. For maintenance purposes, the problems of clearing caches 80 and preapproval database entries 50 can be addressed in a number of ways. It can be addressed by recognition of the customer card at checkout. The caches 80 and preproval database 50 can also be maintained by an aging timeout feature, or by cleaning up the entries as part of the store close accounting procedure, or can be maintained programmatically upon demand.

In another embodiment of the customer checkout accelerator 10, additional marketing channels can be added as part of the checkout process. Currently, there is a trend in the retail industry in which companies find themselves in the middle of mergers, acquisitions, and partnerships. A number of these merged enterprises are companies that sell dissimilar items, for example, supermarket food items and retail store items. The most notable trends are supermarkets acquiring retailers; the advent of super stores such as Super Wal-Mart and Big KMart combine supermarket items with retail goods; and the combination of "brick and mortar" stores with acquired "click and mortar" Internet stores. The problems faced by these combined enterprises are how to effectively leverage the sales potential of the merged enterprise. Another problem facing retailers is that they are continuously looking for new channels to market their products. For example, a "brick and mortar" store with an acquired "click and mortar" Internet store is faced with the problem of providing additional web portals for new POS channels to market the goods of each of the merged companies. An additional feature of the customer checkout accelerator 10 is the provision of an additional marketing channel for merchants at the time of an electronic payment preapproval. The marketing channel integrated into the functionality of the CCA 10 provides the store an additional POS to sell store specials, specials from the merged company, or specials from a third company (e.g., Amazon.com). The additional marketing channel feature can be provided in the checkout lane or elsewhere within the physical store.

Figure 3:
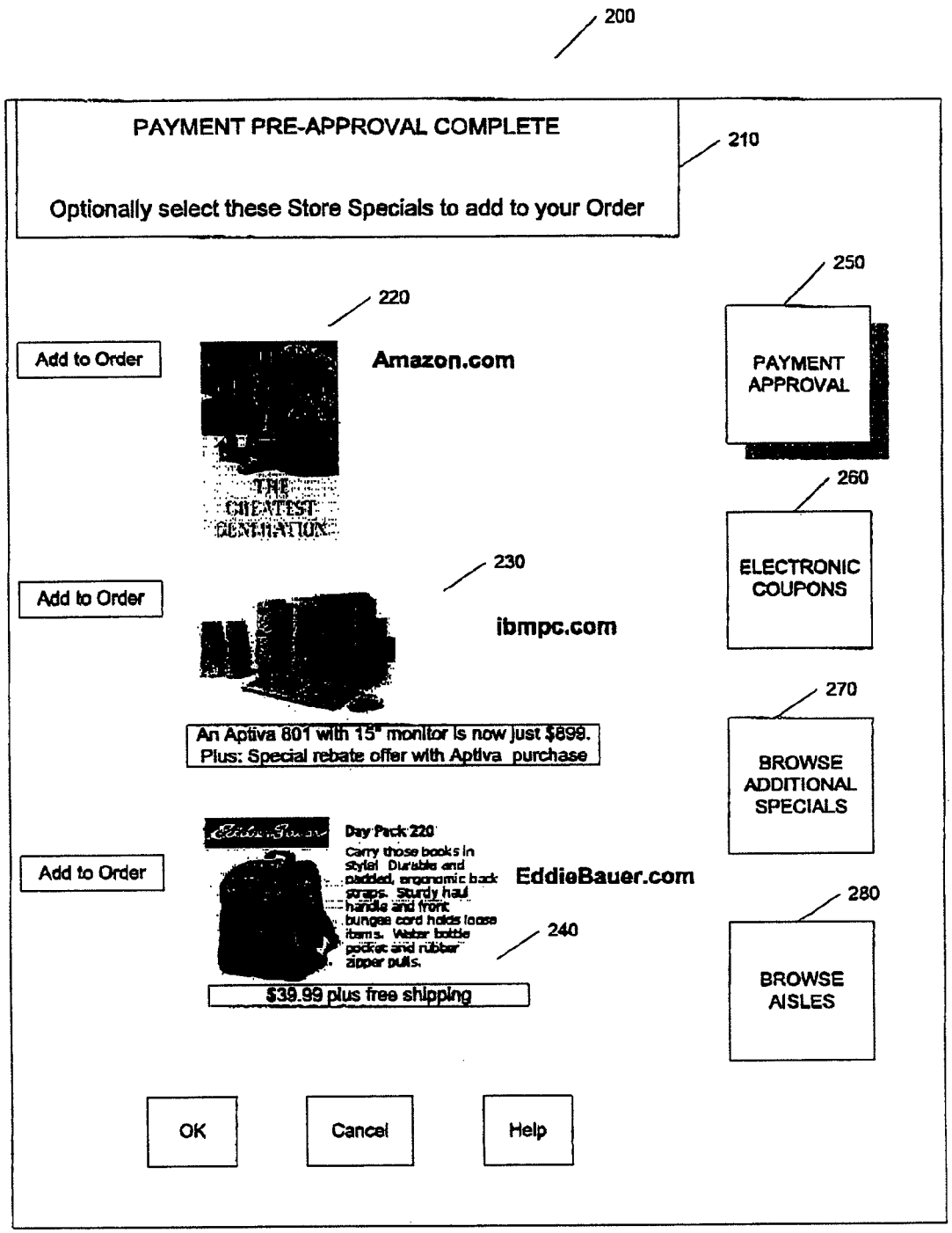
FIG. 3 illustrates a special items display that can be added to a purchase order transaction in accordance with an exemplary embodiment of the present invention.

In addition to the base function of the CCA 10 that notifies the customer about the success of the payment preapproval request, the CCA 10 is extended to graphically display some additional "special" items that the customer can purchase. The customer can easily add one or more of the items to their purchase by hitting appropriate buttons on the touch screen display. FIG. 3 illustrates an example rendering of a screen 200 that can be presented to the customer. The figure illustrates the simple, intuitive, easy to use, graphical user interface that provides the additional market channels. The payment preapproval is indicated in window 210. Three additional special items are also displayed on the screen 200. These include an offer 220 from Amazon.com, an offer 230 from IBM, and an offer 240 from Eddie Bauer. Other interactive controls include payment approval key 250, electronic coupons key 260, browse additional specials key 270, and browse aisles key 280.

The logistics of the delivery of the additional purchase items is not part of the present invention. The items can be picked up in the store if available there, or can be delivered to the customer's home address. An important aspect of this additional feature of the invention is the integration between the "brick and mortar" and the "click and mortar" Internet stores, and the collaborative marketing possibilities that can be developed.

At this point, the CCA 10 send a message over the socket connection to the POS terminal application 30 with the preapproval information along with information on any additional items purchased. This allows the POS terminal application to build a cache 80 of preapprovals. As before, the POS terminal application 30 does not need to go back to the store controller to access the preapproval database 50 during each transaction. When the order is rung, the additional items purchased at the CCA 10 can also be printed out on the customer receipt.

In another embodiment of the preset invention, the customer checkout accelerator is provided with a consumer-driven option capability his additional feature provides a method to satisfy the demands of the emerging sophisticated consumer by specifically providing a method of immigration from a store-centric view of marketing to a consumer-centric view of marketing. The concept involved is to enable customers to use their favorite Internet portals to purchase items of interest to them while they are shopping at another retail enterprise. The key concept in the additional feature is to integrate customer preferences into a retail store system to provide an individualized service. The consumer is given control over the types of additional items that may be purchased ding checkout from the vendors of the consumer's choice. An advantage of the customer personalization feature is that it allows retailers to capitalize on the micro-marketing trend in the retail industry where mass merchandisers can give the appearance of one-to-one marketing. This feature of the invention has two aspects. In the first aspect, the customer selects the additional vendors to be displayed on the CCA system 10. In a second aspect, a customer's selected web portals are presented on the CCA system. The first aspect is implemented by simply present a selection list to the consumer. The application can be run via the Internet to enable the consumer to make selections and/or modifications at home (from any web browser) or the consumer can run the application at the physical store location. The consumer's selection criteria are then stored in the customer loyalty database, with the selections being in the form of URLs. The second aspect is implemented in the following manner. When the customer is waiting in the checkout line and using the CCA 10 for a payment preapproval, the CCA: (1) preapproves the customer for x dollars; (2) personalizes the CCA to display the URLs the customer has selected for viewing with the intent of possible purchase of additional items that are of interest; and (3) enables the consumer to optionally purchase additional items while waiting in the checkout line.

This additional feature of the present invention enables retail stores to track purchases from third parties and to bill the third parties for each purchase made via the CCA. This provides an additional revenue source for the retail store. The amount of time that third party portals are displayed can also be tracked and the third parties billed for the advertising time.

Figure 4:
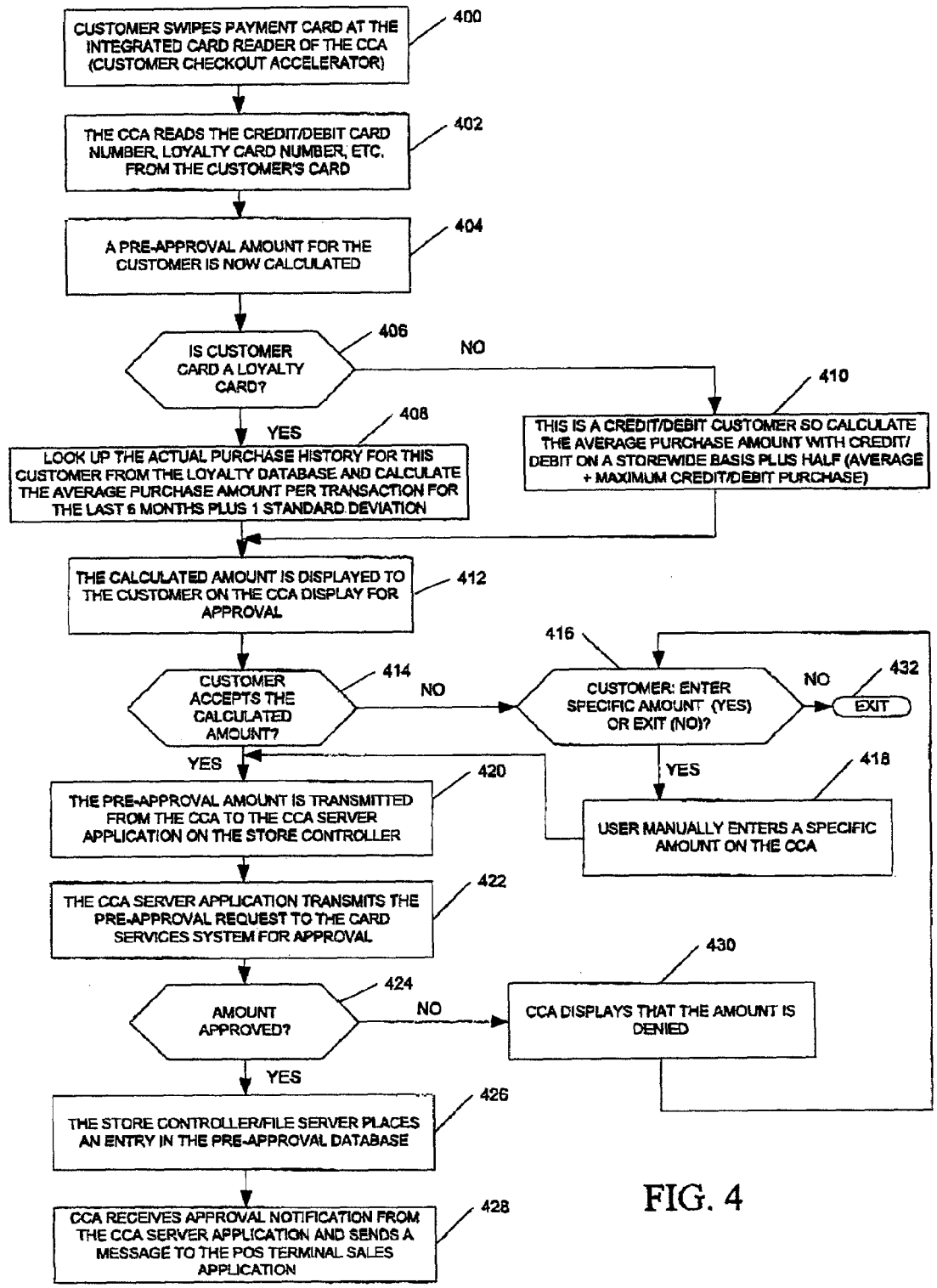
FIG. 4 illustrates the processing logic for the customer checkout accelerator in accordance with an exemplary embodiment of the present invention.

FIG. 4 illustrates the processing logic for the customer checkout accelerator. References to payment card in FIG. 4 represents any of the following: a credit card, a debit card, a combination card, an electronic wallet, a gift card (electronic gift certificate), etc. The combination card is a smart card that contains store information such as the customer's loyalty card number, as well as the credit or debit card number. The benefit of having a combination card is that the consumer only needs to carry and have a single card scanned versus carrying and scanning multiple cards. The processing starts in logic block 400 when the customer swipes the payment card at the integrated card reader of the CCA. The CCA reads the credit/debit card number, the loyalty card number, etc. from the customer's card as indicated in logic block 402. A preapproval amount for the customer is calculated as indicated in logic block 404. As part of calculation of the preapproval amount, a test is made in decision block 406 as to whether or not the customer card is a loyalty card. If it is a loyalty then as indicated in logic block 408, the actual purchase history for the customer is looked up in the loyalty database and the average purchase amount per transaction for the last six months is calculated for the customer and a standard deviation added to the calculated amount. If the customer card is not a loyalty card, then as indicated in logic block 410, the transaction is a credit/debit purchase so the average purchase amount with credit/debit on a storewide basis is calculated and ½ of the average of the maximum credit/debit purchases (on a storewide basis) is added to determine a preapproval amount.

Logic blocks 408 and 410 provide two simple methods of calculating a preapproval amount. These are intended to be examples only and any algorithm can be applied based on the retail store's preferences. In logic block 412, the calculated amount is displayed to the customer on the CCA display for approval. In decision block 414, the customer either accepts or rejects the calculated amount. If the customer rejects the calculated amount, processing continues in logic block 416 wherein the customer enters a specific amount or exits from the transaction. The user can manually enter a specific amount on the CCA as indicated in logic block 418. Alternatively, the user can exit from the transaction as indicated in termination block 432. After the user manually enters a specific amount on the CCA or accepts the calculated amount as determined in decision block 414, the preapproval amount is transmitted from the CCA 10 to the CCA server application 60 on the store controller (logic block 420). The CCA server application 60 then transmits the preapproval request to the card services application 70 for approval as indicated in logic block 422. If in decision block 424, the amount is not approved, the CCA displays that the amount is denied as indicated in logic block 430. Processing then loops back to decision block 416 where the customer can reenter a different amount or exit from the transaction. If the amount is approved in decision block 424, the CCA server application 60 running on the store controller/file server places an entry in the preapproval database 50 as indicated in logic block 426. The CCA 10 receives approval notification from the CCA server application 60 and sends a message to the POS terminal sales application, as indicated in logic block 428. The POS terminal sales application stores the information in the preapproved cache 80.

Figure 5:
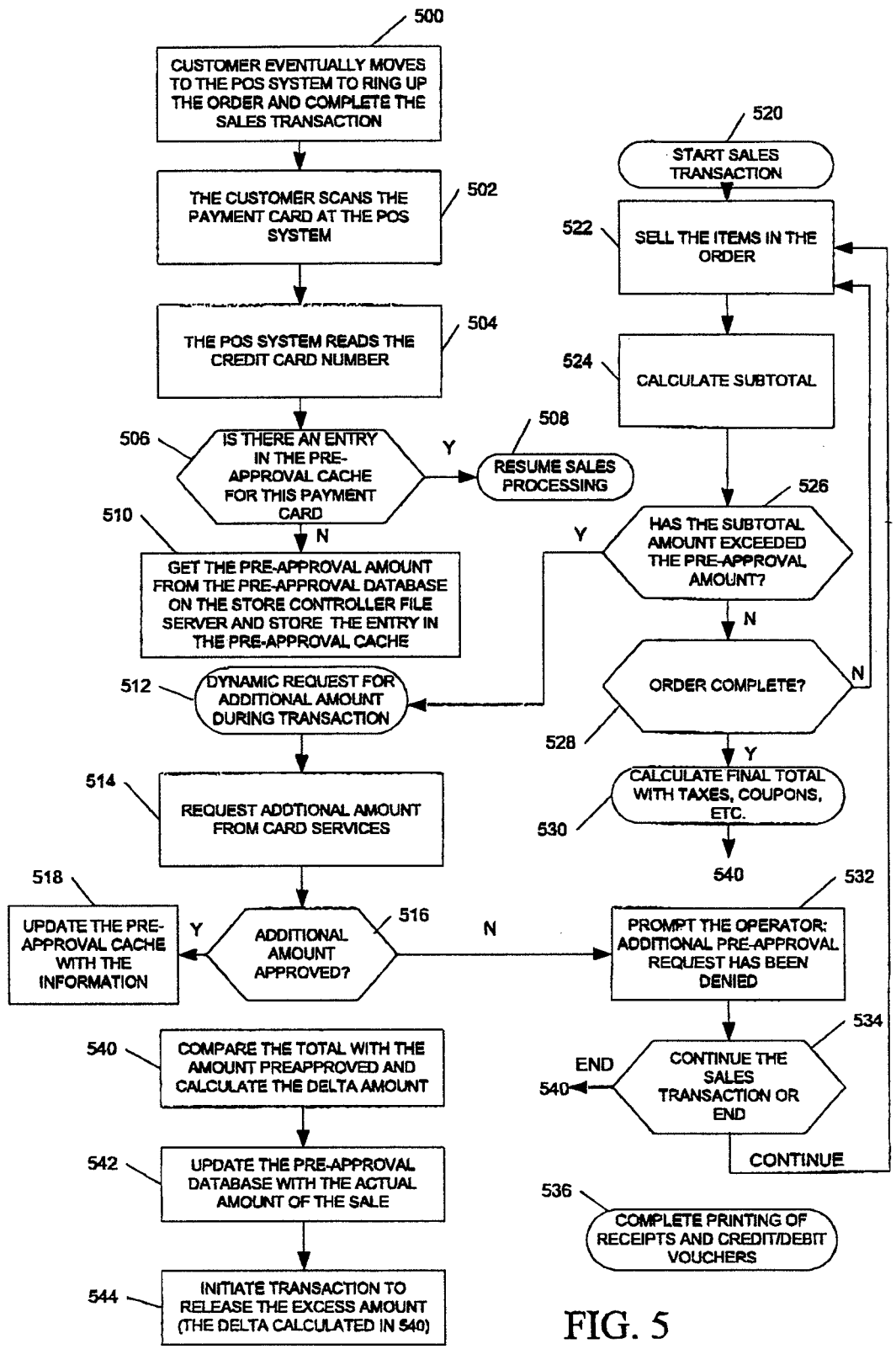
FIG. 5 illustrates the processing logic that executes in a point of sale terminal in conjunction with the customer checkout accelerator in accordance with an exemplary embodiment of the present invention.

FIG. 5 illustrates the processing logic that occurs in the point of sale terminal in conjunction with the processing in the customer checkout accelerator. It illustrates how the point of sale terminal 30 uses and accesses the preapproval amounts that were determined as a result of the processing of FIG. 4. In FIG. 5, there are two independent software modules that are running concurrently, i.e., the POS terminal sales application 30 and the preapproval processing software 10. The POS terminal sales application steps are identified on the right-hand side of FIG. 5. The preapproval software steps are identified on the left-hand side of FIG. 5. Processing starts in logic block 500 with the customer moving to the POS system to have his order rung up and to complete the sales transaction. The customer scans the payment card at the POS system as indicated in logic block 502. The POS system reads the credit card number as indicated in logic block 504. Next, in decision block 506, a test is made to determine if there is an entry in the preapproval cache for this payment card. If there is, then sales processing is resumed as indicated in termination block 508. If, in decision block 506, it is determined that there is no entry in the preapproval cache for this payment card, then the preapproval amount is obtained from the preapproval database on the store controller file server and the entry is stored in the preapproval cache (logic block 510). This condition can occur when a customer has been preapproved in one lane, but has since moved to another checkout lane.

Concurrently, the sales transaction is begun at the point of sale terminal as indicated in logic block 520. The items in the purchase order are then sold as indicated in logic block 522. The POS system calculates a subtotal as indicated in logic block 524. Next, as indicated in logic block 526, a test is made to determine if the subtotal amount has exceeded the preapproval amount. If the subtotal amount has exceeded the preapproval amount, then processing continues in logic block 512 with a dynamic request for an additional amount during the transaction. If the subtotal amount has not exceeded the preapproval amount in decision block 526, then in decision block 528, a test is performed to determine if the purchase order is complete. If it is not, processing loops back to logic block 522 to sell the next item in the purchase order. Otherwise, in logic block 530, the final total including taxes coupon discounts, etc., is calculated. Processing then continues in logic block 540 as discussed below.

Following a dynamic request for an additional amount during the transaction in logic block 512, a request for an additional amount from remote card services is performed as indicated in logic block 514. In decision block 516, a test is made to determine if the additional amount has been approved. If "yes", then in logic block 518, the preapproval cache is updated with the information. If the additional amount is not approved in decision block 561 then as indicated in logic block 532, the POS operator is prompted that the additional preapproval request has been denied. At this point, the consumer can either continue the sales transaction or end it. To continue the sales transaction, processing returns to logic block 522. To end a sales transaction, processing resumes with logic block 540. It is next step, the transaction total is compared with the amount preapproved and the difference (delta amount) is calculated. The approval database is then updated with the actual amount of the sale as indicated in logic block 542. This is followed in logic block 544 with the initiation of a transaction to release the excess amount, i.e., the delta amount calculated in step 540. To complete the sales transaction, receipts are printed and credit/debit vouchers are printed as well, as indicated in termination block 536.

Figure 7:
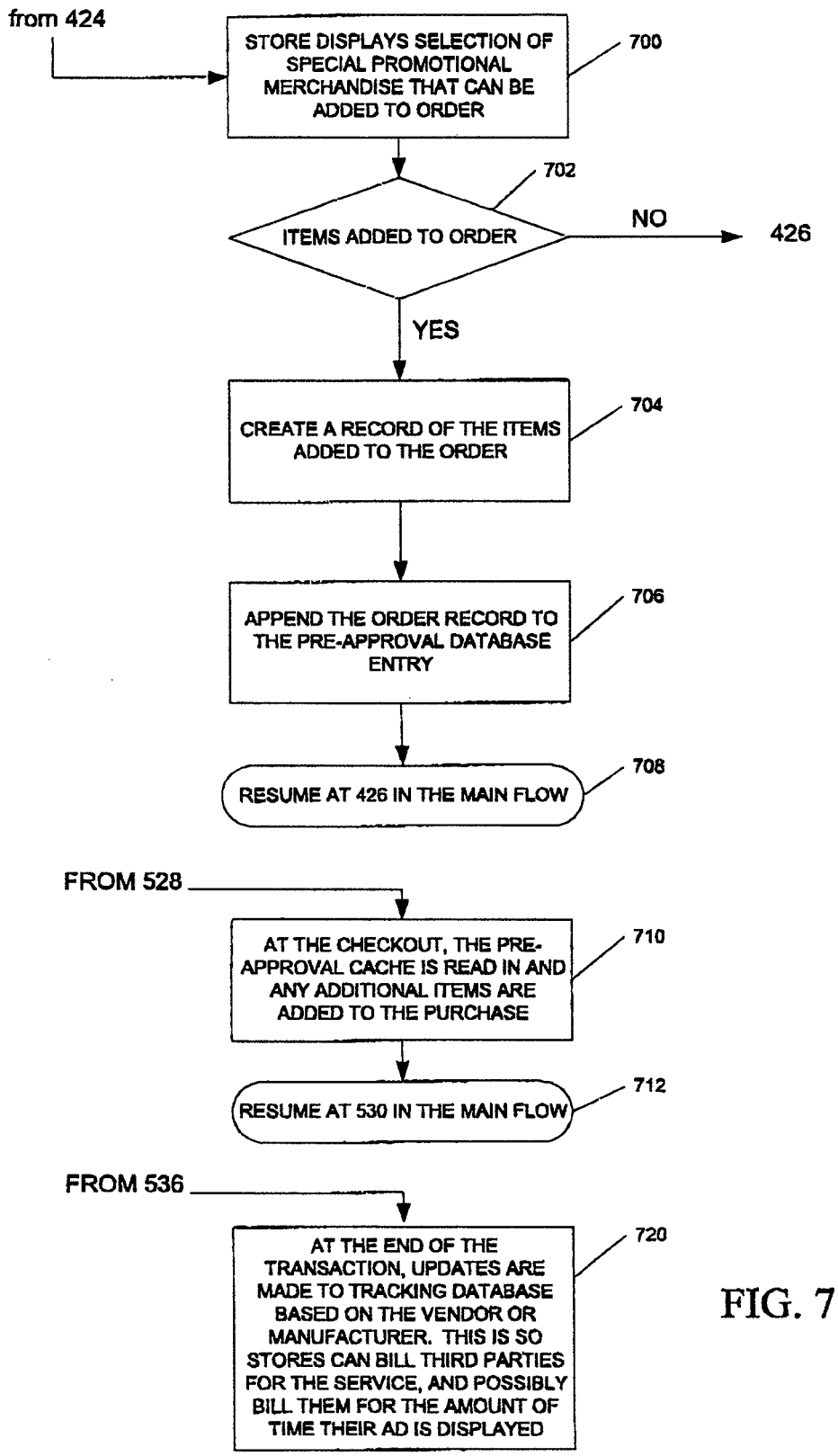
FIG. 7 illustrates the processing logic for the store-driven options component in accordance with an exemplary embodiment of the invention.

FIG. 7 illustrates the processing logic for the store driven options component of the customer checkout accelerator. Processing is invoked from decision block 424 in FIG. 4. As indicated in logic block 700, the store displays a selection of special promotional merchandise that can be added to the order. The customer is enabled to add additional items to the order as indicated in decision block 702. If the customer decides not to add to his order, processing returns to logic block 426 in FIG. 4. Otherwise, a record is created of the items that the customer wants added to his order as indicated in logic block 704. This is followed in logic block 706 by the appending of the order record to the preapproval database entry. Processing then resumes at logic block 426 in FIG. 4 as indicated in termination block 708.

After determining in decision block 528 of FIG. 5 that the order has been completed, processing jumps to logic block 710 in FIG. 7 where the preapproval cache is read in at the checkout counter and any additional items are also added to the purchase. Processing then resumes at logic block 530 in FIG. 5 as indicated by termination block 712.

Following the completion of the printing of receipts and credit/debit vouchers in logic block 536 of FIG. 5, updates are made to the tracking database based on the vendor or manufacturer involved in the additional sales transaction. This enables the retail store to bill third parties for the service and possibly bill them for the amount of time a particular ad of the third party is displayed. This is indicated in logic block 720.

Figure 8:
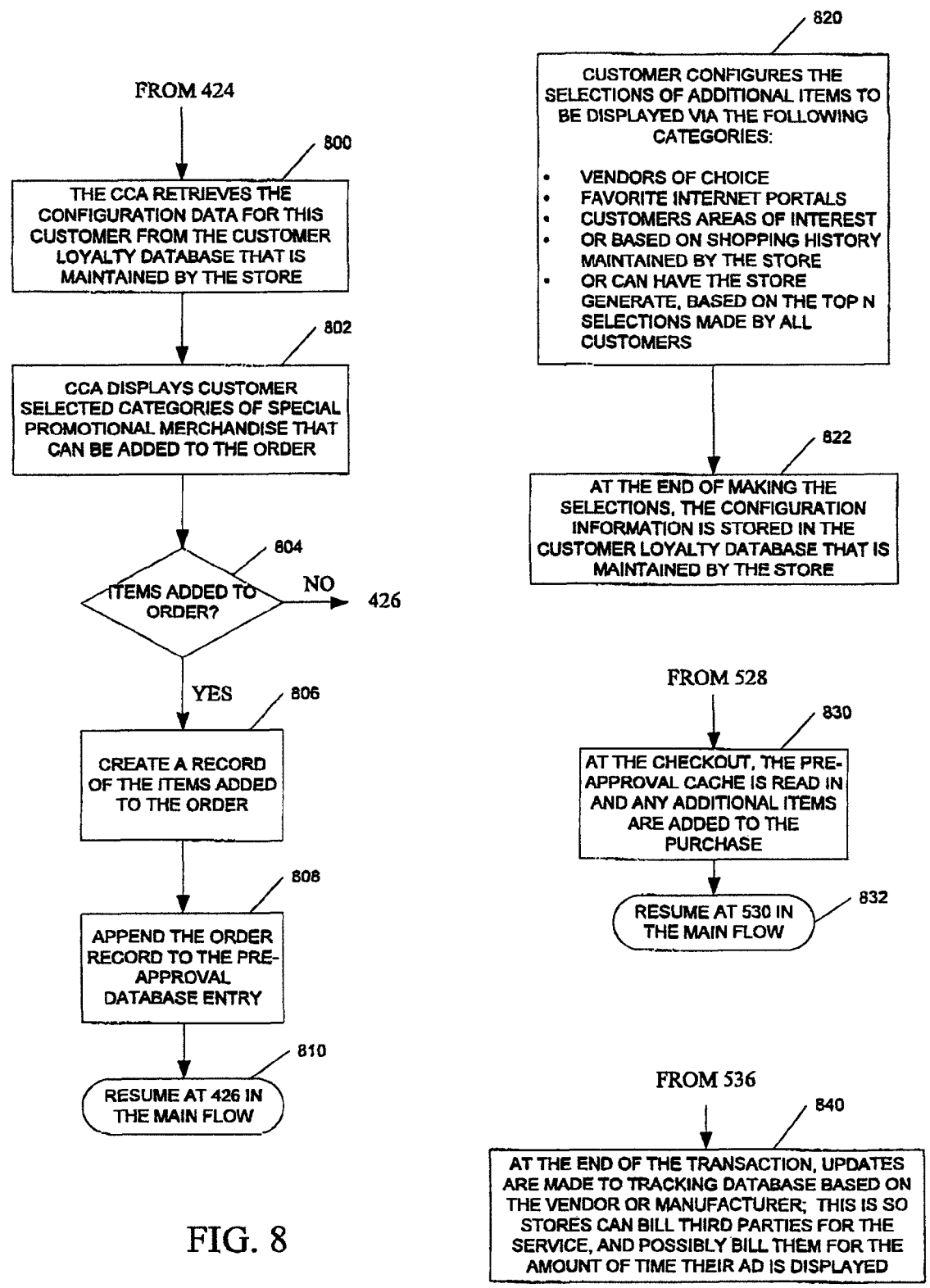
FIG. 8 illustrates the processing logic for the customer driven options component in accordance with an exemplary embodiment of the present invention.

FIG. 8 illustrates the processing logic for the customer-driven option component of the customer checkout accelerator. Processing jumps from decision block 524 in FIG. 4 to logic block 800 in FIG. 8. As indicated in logic block 800, the CCA retrieves the configuration data for a customer from the customer loyalty database that is maintained by the store. The CCA displays customer selected categories of special promotional merchandise that can be added to the order as indicated in logic block 802. Next, in decision block 804, a determination is made as to whether or not items should be added to the order. If no, processing returns to logic block 426 in FIG. 4. Otherwise, processing continues in logic block 806 with the creation of a record of the items that are added to the order. The order record is then appended to the preapproval database entry as indicated in logic block 808. Processing then resumes at logic block 426 in FIG. 4 as indicated in termination block 810.

Proceeding from the testing for completion of the order in decision block 528 of FIG. 5, processing jumps to logic block 830, in which the preapproval cache is read in, and any additional items are added to the purchase. Processing then resumes at logic block 530 of FIG. 5, as indicated in termination block 832. Updates are made to the tracking database based on the vendor or manufacturer in order for the store to bill third parties for the service and possibly for the amount of time an ad is displayed at checkout.

Following the completion of the printing of receipts and credit/debit vouchers in logic block 536 of FIG. 5, updates are made to the tracking database based on the vendor or manufacturer involved in the additional sales transaction. This enables the retail store to bill to parties for the service and possibly bill them for the amount of time a particular ad of the third party is displayed. This is indicated in logic block 840.

There are two additional steps illustrated in FIG. 8 that document the manner in which a customer configures the additional items that are displayed by the CCA 10 when the customer is in the checkout lane. As indicated in logic block 820, the customer configures the selection of additional items to be displayed via one or more of the following categories: vendors of choice; favorite Internet portal; customer's areas of interest; shopping history of customers maintained by the store; top N selections made by all customers in the store. These additional categories are exemplary only. Other categories can be used based on each retailer's preferences. This is followed in logic block 822 by storing of the configuration information in the customer loyalty database that is maintained by the store.

The present invention can be realized in software or a combination of hardware and software. Any kind of computer system or other apparatus adapted for carrying out the methods described herein is suited. A typical combination of hardware and software could be a general purpose computer system with a computer program that, when loaded and executed, controls the computer system such that it carries out the methods described herein. The present invention can also be embedded in a computer program product, which includes all of the fares enabling the implementation of the methods scribed herein and which, when loaded in a computer system, is able to carry out these methods.

Computer program instructions or computer program in the present context means any expression in any language, code or notation, or a set of instructions intended to cause a system having an information processing capability to perform a particular function, either directly or when either or both of the following occur: (a) conversion to another language, code or notation; (b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of the other features. Accordingly, the foregoing description of the preferred embodiment is provided for the purpose of illustrating the principles of the present invention and not in limitation thereof since scope of the present invention is defined solely by the appended claims.

What is claimed:

1. A system for accelerating the sales transactions of customers in a retail store, comprising:
    a customer checkout accelerator that provides a customer user interface that is used to initiate a request for a preapproval amount for a sales transaction;
    a card reader attached to, or integrated into, the customer checkout accelerator that reads a customer payment card number when the card is swiped through the card reader;
    processing logic for said customer checkout accelerator configured to calculate the preapproval amount for the sales transaction;
    a customer checkout accelerator server module residing on a store controller server that receives the preapproval amount for the sales transaction and transmits the preapproval amount to an external card services system for approval; and
    a preapproval cache located at a point of sales terminal that stores the preapproval amount for use in completing the sales transaction.

2. The system for accelerating the sales transactions of customers in a retail store of claim 1 further comprising a preapproval database for storing a record for each approved sales transaction amount.

3. The system for accelerating the sales transactions of customers in a retail store of claim 2 wherein the preapproval database is a keyed access file.

4. The system for accelerating the sales transactions of customers in a retail store of claim 2 wherein the preapproval database is a relational database.

5. The system for accelerating the sales transactions of customers in a retail store of claim 1 further comprising a graphical user interface (GUI) that receives customer input from a terminal sales application and displays the customer input in a full screen display of the customer checkout accelerator.

6. The system for accelerating the sales transactions of customers in a retail store of claim 1 wherein the customer checkout accelerator server module contains processing logic that provides interfaces between a plurality of operational customer checkout accelerators in the retail store and credit or debit card service providers for payment authorization.

7. The system for accelerating the sales transactions of customers in a retail store of claim 2 wherein the customer checkout accelerator server module contains processing logic that provides interfaces between a plurality of terminal sales applications, each operating on a point sales terminal, and the preapproval database.

8. The system for accelerating the sales transactions of customers in a retail store of claim 2 wherein the customer checkout accelerator server module contains processing logic that provides access to the preapproval database.

9. The system for accelerating the sales transactions of customers in a retail store of claim 1 wherein the customer checkout accelerator server module contains processing logic that sends payment approval amount information to a terminal sales application at the point of sales terminal for caching in the preapproval cache.

10. The system for accelerating the sales transactions of customers in a retail store of claim 1 wherein the customer checkout accelerator server module contains processing logic that maintains and updates the preapproval cache and a preapproval database.

11. The system for accelerating the sales transactions of customers in a retail store of claim 1 wherein the customer checkout accelerator server module contains processing logic that updates and maintains a vendor tracking database to bill a vendor for displaying on the customer checkout accelerator a vendor advertisement for merchandise that can be made available through a hyperlink to the vendor's Internet web site.

12. The system for accelerating the sales transactions of customers in a retail store of claim 1 wherein the customer checkout accelerator server module contains processing logic that displays either store-configured or customer-configured hyperlinks to Internet web sites for the purchase of additional items in a checkout lane.

\* \* \* \* \*